US005834666A

United States Patent [19]

Wanner et al.

[11] Patent Number: 5,834,666

[45] Date of Patent: Nov. 10, 1998

[54] WIND INSTRUMENT HAVING A COMPACT SLIDE CONFIGURATION

[75] Inventors: John H. Wanner, Wharton, Tex.; Donald E. Getzen, Lake Geneva, Wis.

[73] Assignees: John Wanner, Wharton, Tex.; Donald Getzen, Lake Geneva, Wis.

[21] Appl. No.: 660,547

[22] Filed: Jun. 10, 1996

[51] Int. Cl.[6] .......................... G01D 7/10

[52] U.S. Cl. .......................... 84/395; 84/396; 84/398

[58] Field of Search .......................... 84/394, 395, 396, 84/398, 399

[56] References Cited

U.S. PATENT DOCUMENTS

| | | | |
|---|---|---|---|
| 673,983 | 5/1901 | Harrison | 84/395 |
| 1,428,675 | 9/1922 | Alschausky | 84/395 |
| 2,093,993 | 9/1937 | Adriani | 84/395 |
| 3,933,079 | 1/1976 | Gillespie | 84/388 |

*Primary Examiner*—William M. Shoop, Jr.
*Assistant Examiner*—Shih-yung Hsieh
*Attorney, Agent, or Firm*—Samuel Louis Sachs

[57] ABSTRACT

A brass wind instrument which changes pitch by varying the tube lengths thereof which includes a slide portion which is substantially half the physical length of a conventional slide. The slide assembly comprises two substantially U-shaped tubes which slidably engage corresponding tubes on a fixed portion of the trombone. The fixed portion of the trombone accommodates a conventional bell and a conventional mouthpiece. The slide assembly includes first and second substantially U-shaped slide tube members each having a pair of adjacent legs that slidably engage the fixed portion of the trombone. The slide assembly is configured such that customary pitch positions are obtainable.

100 Claims, 4 Drawing Sheets

WIND INSTRUMENT HAVING A COMPACT SLIDE CONFIGURATION

BACKGROUND OF THE INVENTION

1. Field of the Invention

The present invention relates to wind instruments, and more particularly to slides for trombones or other brass wind instruments which achieve pitch changes by variably positioning the slide along cooperating fixed length receiver tube members.

2. Description of the Prior and Contemporary Art

Of all the brass wind instruments, the slide trombone is one of the most unique. The basic concept of varying the length of instrument tubing through which vibrated air passes to vary the pitch of the resulting sound is common to most brass wind instruments. This effect is usually achieved, in instruments other than trombones, by finger actuated valves which help to selectively form and interpose differently lengthen tubular segments into the flow path of the air. In contrast, the user of a slide trombone varies the tube length thereof and the resulting sound pitch by selectively telescoping the trombone slide which is slidably mounted on a plurality of stationary fixed lengths of tubing, known as receivers, as hereinafter described.

The conventional trombone has a mouthpiece mounted on a fixed length of straight tubing. The trombone also includes a bell from which sound emanates when the instrument is played. A second fixed length of straight tubing is coupled on one end thereof through a U-shaped section of tubing to the bell. A thin, usually cylindrical connector bar physically joins the mouthpiece to the bell portion thereby configuring the two fixed lengths of straight tubing in a substantially parallel relationship. The free end of each of the fixed lengths of tubing, or receivers, terminate in a raised angular section or lip called a "stocking". A U-shaped section of tubing forming a "slide" provides two leg portions each having an inner diameter slightly greater than the outer diameter of the stockings of the fixed length straight members of tubing. The slide is slidably mounted on the two fixed length straight tube members by slipping of the slide legs over the inner tube stockings. Grease or cream is applied to the stockings before the instrument is played and therefore the slide rides freely along the inner tube members thereby varying the length of the tubing through which air travels between the mouthpiece and the bell of the trombone. Extending the tube length of the instrument by a slide rather than by valves permits a more continuous, rather than discrete, change in pitch which provides a sound unique to the trombone as compared to other wind instruments.

Unfortunately, the length of tubing required to fabricate a trombone slide which can produce the desired range in pitch is great and the slide, especially in its fully extended or seventh position, makes the slide trombone somewhat difficult to play where space is at a premium. In addition, some musicians with relatively short arms, such as children, are often unable to play the slide trombone because they cannot reach the most extended slide positions. Further, when the slide is in the seventh position nearly all of the weight thereof is transferred as torque to the two stockings and the associated receiver tube members, resulting in sluggish slide movement.

In attempts to overcome the inherent disadvantages of the conventional slide trombone, various inventors have attempted to reconfigure the slide. In U.S. Pat. No. 673,983 issued to Harrison on May 14, 1901 and U.S. Pat. No. 2,093,993 issued Adriani on Sep. 28, 1937, the providing of two connected U-shaped slide elements, instead of the typical one, is suggested. Adriani shows a trombone wherein air passes from a mouthpiece through a first U-shaped slide element in a selected plane, into a return bend means, and then into a second U-shaped slide element, in the same plane, the output from the second U-shaped slide element entering a bell portion. The two U-shaped slide elements are connected together such that both elements slide as a single slide element. While shortening the length of the instrument by essentially looping back the slide, this double slide arrangement introduces a serious pitch problem. Similarly, Harrison teaches a trombone essentially the same as Adriani with the two U-shaped slides being adjacently disposed in parallel planes, this configuration also resulting in a pitch problem. The instant inventor also tackled this problem in U.S. Pat. No. 4,831,911 to Wanner which features a compact state design.

Specifically, these, as well as other slide trombones or such similar slide instruments are made up of two types of tubing: fixed and expandable. The bell portion and the mouthpiece portion are essentially fixed lengths of tubing. In Adriani and Harrison, several relatively lengthy bent sections are employed which also represent fixed lengths of tubing. In addition, the fixed length straight inner tube members on which the slide elements ride are also of a fixed length. The portion of the slide which extends beyond the fixed length inner tube members represents the expandable portion of the tubing. While it is desirable to achieve the same sound output from a double slide trombone as is achievable from a conventional slide trombone, it is vital that the length and ratios of the fixed tubing to expandable tubing remain unchanged. An examination of Harrison and Adriani suggest that these prior art configurations create a problem in this regard. Harrison includes several large bends which increase the amount of fixed length tubing in the trombone by several inches. Similarly, Adriani provides bends or crooks which similarly greatly increase the amount of fixed instrument tubing length when compared to the conventional single slide trombone.

Based on the prior art, if a double slide trombone is to produce the same pitch output as a conventional single slide trombone in the closed or first position, either (1) the length of the bell portion can be shortened in order to accommodate the addition length resulting from the return bends or crooks or (2) the length of the double slide and the inner tube members on which it travels can be shortened to achieve the first position. However, shortening the length of the double slide and the inner tube members results in an undesirable shortening of the expandable portion of the tubing to a length less than that of the conventional trombone. The seventh or fully extended position and associated pitch thus become unattainable. The increase in fixed tubing in the double slide configuration of Harrison and Adriani thus create a dilemma wherein either the bell portion must be specifically designed for the double slide instrument or the first position or the seventh position and their associated pitches become unattainable.

Adriani also teaches a trombone embodiment which is a radical departure from a conventional trombone configuration. Specifically, Adriani proposes a trombone in the embodiment illustrated in FIG. 1 thereof which does not necessarily suffer from the aforementioned pitch problem, but which substitutes for the pitch problem an extremely awkward configuration. In this configuration, all of the receivers and all of the tubes which make up the slide portions of the trombone are disposed in the same horizontal plane when the instrument is played. This creates a tremendously awkward instrument which does not play like a conventional trombone, which creates numerous unacceptable moments of force, and which is virtually impossible to properly grip. Specifically, because the crook interposed between the two slide elements of this configuration is small as a result of the end crooks of the slide portions being of an arbitrary arcuate diameter, the conventional area in which a slide is grabbed in this configuration will not accommodate a human hand. Additionally, use of this planar slide of Adriani will not properly train a musician so that he can quickly transfer to a conventional trombone when the need arises.

Since, as a practical consideration, it is desirable to utilize a conventional bell and to fit a slide thereto to produce an instrument capable of the conventional pitch range, the inventions taught by Harrison and Adriani can be seen not to achieve such an end. In the one configuration proposed by Adriani which may solve the pitch problem, it is done in a manner which provides a trombone that most trombone players would consider unplayable because of its extremely awkward configuration.

Wanner teaches a compact trombone slide which is capable of the proper pitch range, but is difficult and expensive to manufacture and to keep in tolerance.

Thus, while recognizing a specific need in the music field, the prior art instruments do not overcome the problems associated with double slide configurations.

SUMMARY OF THE INVENTION

Therefore, a primary object of the present invention is to provide a trombone with a compact slide portion.

A further object to the present invention is to provide a trombone with a compact slide that has a conventionally dimensioned bell.

A still further object of the present invention is to provide a trombone with a compact slide that operates in a conventional pitch range.

An additional object of the present invention is to provide a trombone slide configuration which is compact in design and therefore is not easily damaged and is easily maintained.

A still additional object of the present invention is to provide a wind instrument having a compact slide configuration which is fast and responsive with closer positioning, speed, and flexibility.

A still another further additional object of the present invention is to provide a trombone with a compact slide that has the same clarity as a conventional trombone.

Another still further object of the present invention is to provide a wind instrument having a complex slide configuration which is simple in design, relatively inexpensive to manufacture, durable and readily serviceable.

These objects, as well as further objects and advantages of the present invention, will become readily apparent after reading the ensuing description of the non-limiting illustrative embodiments and viewing the accompanying drawings.

A brass wind instrument which changes pitch by varying the tube lengths thereof, according to the principles of the present inventions, includes a first pair of stationary tubes disposed spaced apart from each other in a first plane, each of the tubes of the first pair having a first end and a second end; a second pair of stationary tubes disposed spaced apart from each other in a second plane, each of the tubes of the second pair having a first end and second end, the second plane being spaced apart from the first plane, the second pair of stationary tubes being closer to each other than the first pair of stationary tubes are to each other; means for coupling the first ends of the second pair of stationary tubes to each other; a bell for affixment to the first end of one of the first pair of stationary tubes; a mouth piece for affixment to the first end of the other said first pair of stationary tubes; and a slide assembly, the slide assembly including first and second substantially U-shaped slide tube members, the first and second slide tube members each having a pair of adjacent legs, each of the adjacent legs each having a first and second end, each of the pair of adjacent legs being joined on the first ends thereof by a crook, the second ends of each of the pairs of adjacent legs being dimensioned for slidably engaging a corresponding one of the second ends of the first and second pairs of stationary tubes such that the second ends of the first pair of adjacent legs slidably engage, respectively, one of the second ends of the first pair of stationary tubes and one of the second ends of the second pair of the stationary tubes, the second ends of the second pair of the adjacent legs slidably engaging, respectively, the other of the second ends of the first pair of the stationary tubes and the other of the second ends of the second pair of the stationary tubes, the first and second pairs of substantially U-shaped slide tube members being joined together for simultaneous movement.

As a result of the implementation of this configuration, the length of the instrument during play and the distance between the various slide positions are shortened. As a result, extending the slide to a conventional seventh position pitch does not require as great a reach as with a conventional trombone. Further, the end of the slide does not protrude as far with the present invention as with a conventional trombone, thereby not requiring the same playing area as for a conventional instrument, a characteristic which is helpful, for instance, in marching bands.

BRIEF DESCRIPTION OF THE DRAWINGS

In order that the present invention may be more fully understood, it will now be described, by way of example, with reference to the accompanying drawings in which.

DESCRIPTION OF THE PREFERRED EMBODIMENT

Figure 1:
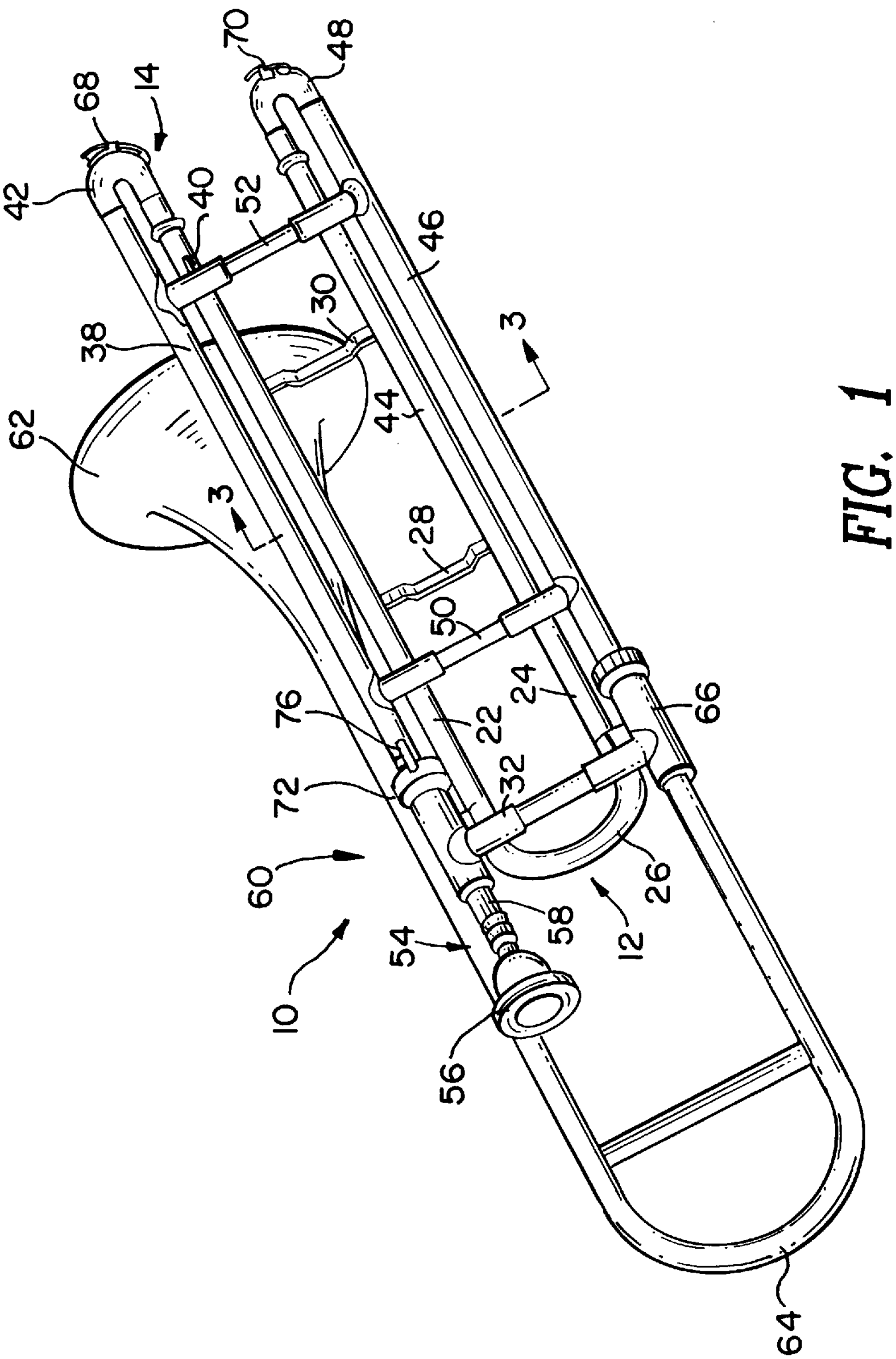
FIG. 1 shows a perspective view of a first embodiment of the present invention incorporates the principles thereof.
Figure 2:
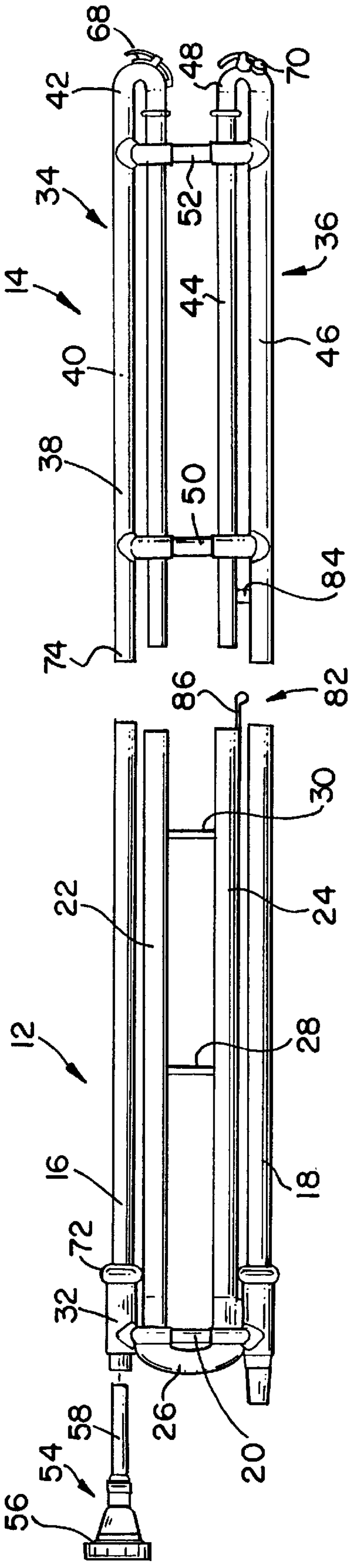
FIG. 2 is a exploded plan view of the present invention.

Referring now to the figures, and more particularly, to FIGS. 1 and 2 thereof there is illustrated therein a brass wind instrument or trombone. Trombone 10 includes a fixed portion 12 and a movable slide assembly 14. The fixed portion 12 consists of a first pair of stationary tubes 16 and 18 joined together by a brace 20 such that the position of the first pair of stationary tubes 16 and 18 are dimensionally stable in space. The fixed portion 12 also includes a second pair of stationary tubes 22 and 24. The second pair of stationary tubes 22 and 24 are joined together by a substantially U-shaped crook 26 so that they are in communication with each other and are conventionally fixed in position by braces 28 and 30. Of course, a different brace configuration or number could be used. The first pair of stationary tubes 16 and 18 are joined by mount 32 so that they are fixed in position relative to each other with the first pair of stationary tubes 16 and 18 being parallel to each other and the second pair of stationary tubes 22 and 24 being parallel to each other. Each of the tubes 16, 18, 22, and 24 are also parallel to each other. The moveable slide assembly 14 includes first and second substantially U-shaped members 34 and 36. Substantially U-shaped member 34 includes a pair of adjacent legs 38 and 40 joined together by a substantially U-shaped crook 42. The substantially U-shaped member 36 includes a pair of legs 44 and 46 joined together by a substantially U-shaped crook 48. The legs 38 and 46 are fixedly secured position relative to each other by braces 50 and 52. The legs 38 and 40 are parallel to each other as are the legs 44 and 46 and each of the legs 38 and 40 and 44 and 46 are also parallel to each other as fixed in position by the braces 50 and 52. The end of the stationary tube 16 is adapted to receive a mouth piece 54 which includes a mouth portion 56. The mouth pipe or venturi 58 is further described herein in conjunction with FIG. 5. As shown in FIG. 1, the trombone 10 includes a bell 60. A bell portion 62 and U-shaped tubing 64 in communication with tube 46 and cooperatingly of 66. Disposed on the crooks 42 and 44 respectively, are water keys 68 and 70 of a conventional design.

The stationary tubes 16 and 18 are dimensioned so as to be slidably receivable within the legs 38 and 40 of the movable slide 14. In addition, the legs 40 and 44 are dimensionally sized to be receivable within the stationary tubes 22 and 24 of the fixed portion 12. As a result of two of the legs of the movable slide assembly 14 serving as receiver tubes and two of the legs of the fixed portion 12 serving as receiver tubes, great dimensional stability and ease of sliding is achieved.

When the trombone is assembled as pictured in FIG. 1, there is continuous communication of air when a user blows into the mouthpiece 54 through the mouth portion 56 into the mouth pipe of venturi 58. From the mouth pipe of venturi 58 the air travels into the stationary tube 16 and then passes through the leg 38 of the moveable slide assembly 13. From the leg 38 the air travels through the crook 42 and into the leg 40 of the movable slide assembly 14. From the leg 40 the air is then communicated to the stationary tube 22 of the fixed portion 12 and through the U-shaped crook 26. After the air leaves the U-shaped crook 26 it travels through the stationary tube 24 of the fixed portion of 12 of the trombone 10 and into the leg 44 of the substantially U-shaped member 36. As air leaves the leg 44, it travels through the crook 48 and then through the leg 46 of the substantially U-shaped member 36. As the air leaves the leg 46 of the substantially U-shaped member 36 it is communicated to the stationary tube 18 of the fixed portion 12 and into the U-shaped tube 64 and out of the bell portion 62 of the bell 60. As such, the path that air travels through the trombone 10 is essentially the same length as the path air travels in a conventional trombone although the mechanical configuration of the trombone 10 is substantially different.

As a result, a tube length of the trombone 10 in the first or shorter position is approximately 110 inches and the instrument tube length in the seventh or longest of the positions is approximately 173 inches.

The trombone 10 is provided with a radial twist lock 72 which is mounted on the mount 32 and is adapted to engage a cuff 74 provided by the leg 38 so that when the radial lock is rotated a flange 76 thereof catches the edge of the cuff 74 to preclude the movable slide assembly 14 from sliding on the fixed portion 12.

Through the unique configuration of having two receiver tubes provided by the fixed portion 12 and two receiver tubes provided by the movable slide assembly 14, proper alignment is always assured since neither the fixed portion 12 or movable slide assembly 14 is inherently dimensionally unstable.

Figure 3:
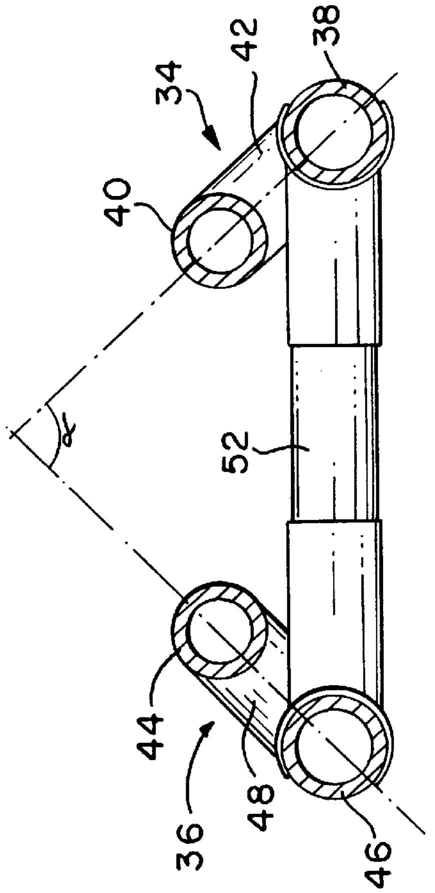
FIG. 3 is a cross-section of the view taken substantially along the lines 3—3 of FIG. 1.

An essential feature of the present invention is the geometrical relationship between the legs 38, 40, 44 and 46, and the mirrored geometrical relationship between the stationary tubes 16, 18, 22, and 24. This is best illustrated in conjunction with FIG. 3 and since all of the aforesaid elements are fixed in position the movable slide assembly 14 is essentially a geometrical mirror of the fixed portion 12. With specific reference to FIG. 3, there are shown therein a cross-section of the movable slide assembly 14 which includes U-shaped members 34 and 36. Substantially U-shaped member 34 includes leg 38 and a leg 40 joined by the substantially U-shaped crook 42. The U-shaped member 36 is shown to include a leg 44 and a leg 46 joined by the substantially U-shaped crook 48. The legs 38 and 46 are joined together by the brace 52. As previously described, the legs 38, 40, 44, and 46 are all mutually parallel. The legs 38 and 40 are parallel to each other as are legs 44 and 46, and all are mutually parallel. The crucial geometrical relationship between the substantially U-shaped members 34 and 36 is that they are positioned such that the longitudal axes of the tubes 38 and 40 fall in one plane and the longitudal axes of the legs 44 and 46 fall into another plane, these two planes defining and an angle A. Angle A is essentially 45 degrees and as a result of this angle, perfect pitch, i.e., essentially the same as that of a conventional trombone is achieved by the instant invention, the trombone 10. This angle has proved to be crucial in producing the proper pitch. As previously discussed, as a result of the cooperation between the fixed portion 12 and the movable slide assembly 14, the same geometry applies to the fixed portion 12 because of coaxial sliding of their respective elements. The first pair of stationary tubes 16 and 18 have their longitudal axes thereof substantially parallel to each other as do the second pair of stationary tubes 22 and 24 and all of the stationary tubes 16, 18 and 22 and 24 are substantially parallel to each other. The longitudal axes of the tubes 16 and 22 fall in the same plane. The longitudal axes of the tubes 18 and 24 fall into another plane. These two planes intersect each other at an angle of essentially 45 degrees.

Figure 5:
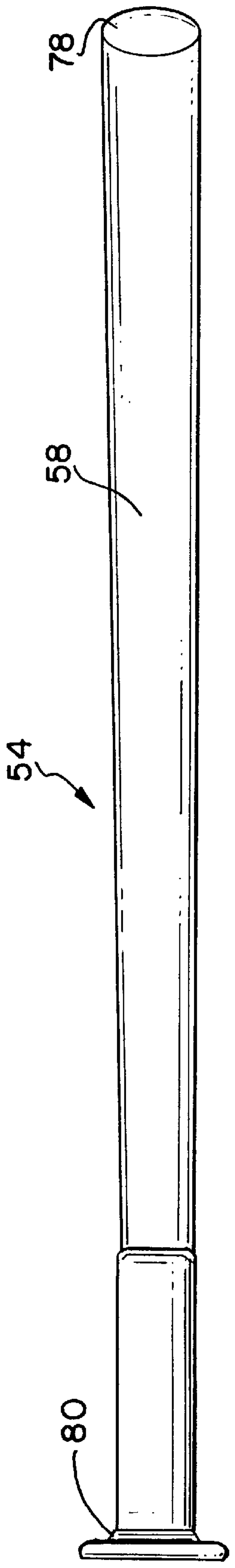
FIG. 5 is an enlarged plan view of the mouthpiece venturi of the subject invention.

With references to FIGS. 1, 2 and 5, the mouth piece 54 is illustrated therein and includes a mouth portion 56 and a mouth pipe or venturi 58. The mouth pipe or venturi 58 in a conventional trombone is substantially seven inches long and includes a conventional taper which is narrower at the mouth portion 56 and wider at the distal end thereof. The mouth piece 54 of the subject invention must be in excess of seven inches and must not exceed nine inches in length to its distal end 78, with a conventional taper. If a seven inch venturi tube is used, then trombone 10 will not have the proper "clarity" that is sound coming therefrom will be fuzzy. Through experimentation it has been ascertained that if the venturi tube is in excess of seven inches but less than or equal to nine inches long, the appropriate "sweet spot" is ascertained and brilliant clarity is provided.

Figure 4:
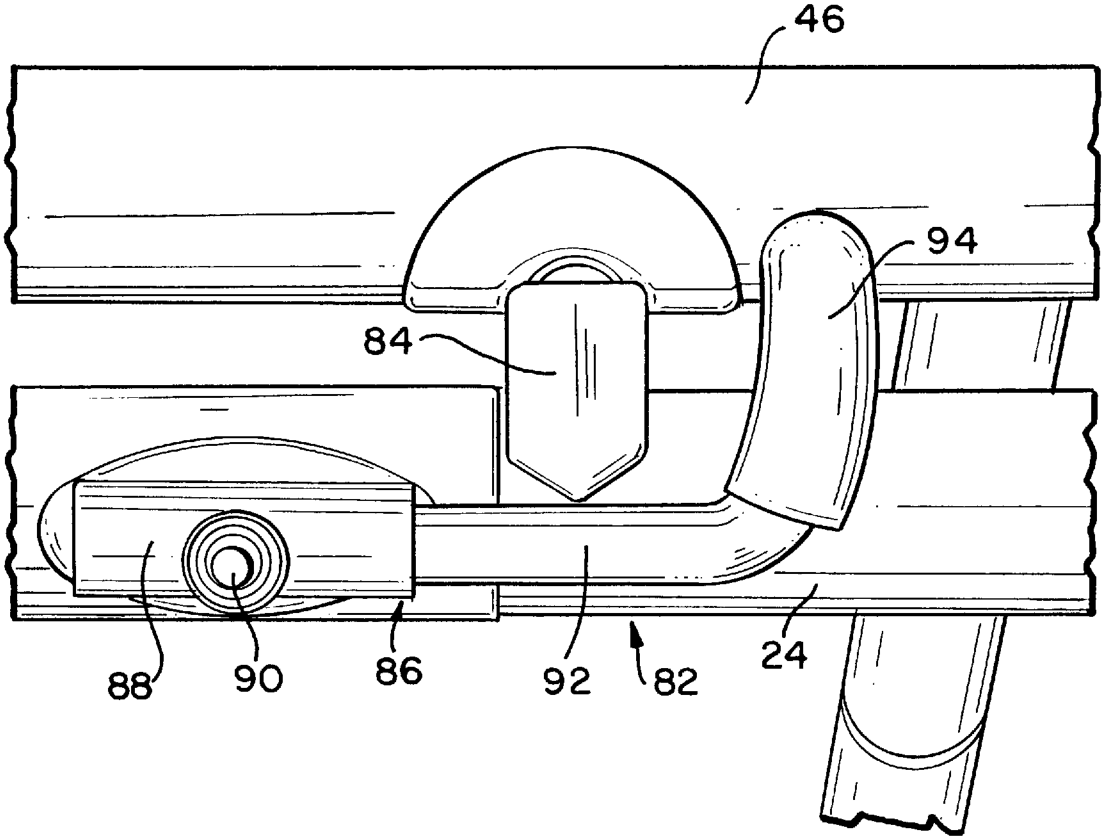
FIG. 4 is an enlarged fractional view of the stop of the present invention.

The mouth pipe or venturi 58 includes threads 80 which are threadably received by the mount 32, such mount 32 serving as a mouthpiece receiver, although other methods of mounting can be used as are well within the skill of those skilled in the art. With reference to FIG. 4, there is shown therein a stop assembly 82. Stop assembly 82 is provided on the trombone 10 for use in training individuals as to the shortened length of slide of the movable slide assembly 14 on the fixed portion 12. Players of conventional trombones may have a tendency to want to move their arm too far and therefore disengage the movable slide assembly 14 from the fixed portion 12. Until the proper range of movement is learned, the stop assembly 82 can be employed. The stop assembly 82 includes a stop 84 secured to the leg 46 of the movable slide assembly 14 and an adjustable catch 86. Adjustable catch 86 has a locking mount 88 with a set screw 90 dimensioned to slidably receive therein an arm 92. Arm 92 is positioned within the locking mount 88 and is held in place by the set screw 90 such that the cushioned end 94 thereof engages the stop 84 when the movable slide assembly 14 is extended. The arm 92 can be adjusted within the locking mount 88 so that the proper maximum extension of the movable slide assembly 14 on the fixed portion 12 is achieved. Ultimately, when the user becomes acquainted with proper use of the trombone 10 the arm 92 can be abandoned. If desired, the slide stop could be differently configured, for example spring loaded.

Although a particular configuration has been shown and described herein for producing a sound substantially identical tothat of conventional trombone, it should be understood that the subject trombone 10 can be changed to produce a tenor trombone or a bass trombone so long as the general geometry is maintained. Although the subject invention allows for this flexibility and is recognized by the inventor, the primary goal of the invention is to produce a compact trombone which plays as a conventional trombone, the creation of differently functioning instruments also being recognized.

Since the fixed portion 12 and the movable slide assembly 14 produce an air path which is the same length as a conventional slide and is configured in a compact configuration, it is suited for retrofitting on a conventional bell of a trombone so that an instrument which permits pitch ranges exactly the same as a conventional trombone can be created. Such retrofitting can be easily accomplished at a minimal cost.

It also should be noted that the subject invention is directed to slide trombones of the tenor, alto, bass or contrabass variety. The invention also extends to any other brass wind instruments which extends the length of its tubing size by means of a slide. In this regard, it should be noted that the term brass does not suggest any limitation as to material of which the instrument is made, but rather conforms to the standard musical instrument classification. For instance, the present invention does extend to instruments which might be constructed of fiberglass as well as metals other than brass.

It should be understood that various changes in the details, materials and arrangements of parts, and operational conditions which have been herein described and illustrated in order to explain the nature of the invention, may be made by those skilled in the art within the principles and scope of the invention.

Having thus set forth the nature of the invention, what is claimed is:

1. A brass wind instrument which changes pitch by varying the tube length thereof comprising:

a first pair of stationary tubes disposed spaced apart from each other in a first plane, each of said tubes of said first pair having a first end and a second end;

a second pair of stationary tubes disposed spaced apart from each other in a second plane, each of said tubes of said second pair having a first end and a second end, said second plane being spaced apart from said first plane, said second pair of stationary tubes being closer to each other than said first pair of stationary tubes are to each other;

means for coupling said first ends of said second pair of stationary tubes to each other, said coupling means being disposed substantially in said second plane;

a bell for affixment to said first end of one of said first pair of stationary tubes;

a mouth piece for affixment to said first end of the other of said first pair of stationary tubes; and a slide assembly, said slide assembly including a first and a second substantially U-shaped slide tube member, said first and said second slide tube members each having a pair of adjacent legs, each of said adjacent legs each having a first and a second end, each of said pair of adjacent legs being joined on said first ends thereof by a crook, said second ends of each of said pairs of adjacent legs being dimensioned for slidably engaging a corresponding one of said second ends of said first and said second pairs of stationary tubes such that said second ends of said first pair of said adjacent legs slidably engage, respectively, one of said second ends of said first pair of said stationary tubes and one of said second ends of said second pair of stationary tubes, said second ends of said second pair of said adjacent legs slidably engaging, respectively, the other of said second ends of said first pair of said stationary tubes and the other of said second ends of said second pair of said stationary tubes, said first and said second pairs of substantially U-shaped slide tube members being joined together for simultaneous movement.

2. An instrument in accordance with claim 1, wherein said first plane and said second plane are substantially parallel.

3. An instrument in accordance with claim 2, wherein said first substantially U-shaped slide member is disposed in a third plane and said second substantially U-shaped slide member is disposed in a fourth plane, said third plane and said fourth plane intersecting at an angle of substantially forty-five (45) degrees.

4. An instrument in accordance with claim 3, wherein said mouth piece includes a venturi tube of conventional taper.

5. An instrument in accordance with claim 4, wherein the length of said venturi tube is in excess of seven inches and does not exceed nine inches in length.

6. An instrument in accordance with claim 1, wherein said mouth piece includes a venturi tube of conventional taper.

7. An instrument in accordance with claim 6, wherein the length of said venturi tube is in excess of seven inches and does not exceed nine inches in length.

8. An instrument in accordance with claim 1, wherein said coupling means comprises a connecting crook of tubing.

9. An instrument in accordance with claim 1, wherein said bell is of conventional length.

10. An instrument in accordance with claim 9, wherein said slide assembly can be slidably positioned along said first and second pairs of stationary tubes in any of at least seven positions corresponding to seven half-tone pitch positions.

11. An instrument in accordance with claim 10, wherein the instrument tube length in said first or shorter of said positions is substantially one hundred and ten inches and the instrument tube length in the seventh or longest of said positions is substantially one hundred and seventy-three inches.

12. An instrument in accordance with claim 1, wherein one of each of said adjacent legs of each of said substantially U-shaped slide tube members comprises a receiver tube, corresponding said stationary tubes being dimensioned to slidably engage over said substantially U-shaped slide tube members, the other of each of said adjacent legs of each of said substantially U-shaped slide tube members being dimensioned to slidably engage over corresponding said stationary tubes which each comprise a receiver tube.

13. An instrument in accordance with claim 12, wherein said first plane and said second plane are substantially parallel.

14. An instrument in accordance with claim 13, wherein said first substantially U-shaped slide member is disposed in a third plane and said second substantially U-shaped slide member is disposed in a fourth plane, said third plane and said fourth plane intersecting at an angle of substantially forty-five (45) degrees.

15. An instrument in accordance with claim 14, wherein said first pair of stationary tubes each comprise said receiver tubes of said first and said second pairs of stationary tubes, said second pair of stationary tubes each being dimensioned to slidably engage over corresponding said substantially U-shaped slide tube members, such said substantially U-shaped slide tube members each comprising said receiver tubes of said substantially U-shaped slide tube members.

16. An instrument in accordance with claim 15, wherein said mouth piece includes a venturi tube of conventional taper.

17. An instrument in accordance with claim 16, wherein the length of said venturi tube is in excess of seven inches and does not exceed nine inches in length.

18. An instrument in accordance with claim 1, further comprising means for precluding said slide assembly from separating from said first and said second pairs of stationary tubes when extended and slidably engaged therewith.

19. An instrument in accordance with claim 18, when said precluding means comprises a stop disposed on said slide assembly and a member disposed on one of said pairs of stationary tubes for engaging said stop.

20. An instrument in accordance with claim 19, when said member is adjustable in length.

21. An instrument in accordance with claim 20, when said member is removable.

22. An instrument in accordance with claim 19, when said member is removable.

23. An instrument in accordance with claim 19, when said member can be engaged or disengaged by the user of said brass wind instrument.

24. An instrument in accordance with claim 1, wherein each of said crooks of said first and said second substantially U-shaped slide tube members have disposed therein an aperture, said first and said second substantially U-shaped slide tube members each further comprising a water key, each of said water keys for selectively covering a corresponding said aperture.

25. An instrument in accordance with claim 1, wherein said slide tube assembly further comprises at least one brace for fixedly positioning said first and said second substantially U-shaped slide tube member relative to each other.

26. An instrument in accordance with claim 1, further comprising at least one brace for fixedly positioning said first and said second pairs of stationary tubes relative to each other.

27. A trombone slide for use in conjunction with a conventional trombone bell and mouthpiece comprising:

a first pair of stationary tubes disposed spaced apart from each other in a first plane, each of said tubes of said first pair having a first end and a second end, said first end of one of said first pair of stationary tubes being adapted to be affixed to said conventional mouthpiece, said first end of the other of said first pair of stationary tubes being adapted to be affixed to said conventional bell;

a second pair of stationary tubes disposed spaced apart from each other in a second plane, each of said tubes of said second pair having a first end and a second end, said second plane being spaced apart from said first plane, said second pair of stationary tubes being closer to each other than said first pair of stationary tubes are to each other;

means for coupling said first ends of said second pair of stationary tubes to each other, said coupling means being disposed substantially in said second plane;

a slide assembly, said slide assembly including a first and a second substantially U-shaped slide tube member, said first and said second slide tube members each having a pair of adjacent legs, each of said adjacent legs each having a first and a second end, each of said pair of adjacent legs joined on said first ends thereof by a crook; said second ends of each of said pairs of adjacent legs being dimensioned for slidably engaging a corresponding one of said second ends of said first and said second pairs of stationary tubes such that said second ends of said first pair of said adjacent legs slidably engage, respectively, one of said second end of said first pair of stationary tubes and one of each said second ends of said second pair of stationary tubes, said second ends of said second pair of said adjacent legs slidably engaging, respectively, the other of said second ends of said first pair of said stationary tubes and the other of said second ends of said second pair of said stationary tubes, said first and second pairs of substantially U-shaped slide tube members being joined together for simultaneous movement, the spacial relationship between said first and said second pairs of stationary tubes and said first and said second substantially U-shaped slide tube members providing an air passage between said conventional bell and said conventional mouthpiece of a length equal to that of a conventional trombone.

28. A trombone slide in accordance with claim 27, wherein said first plane and said second plane are substantially parallel.

29. A trombone slide in accordance with claim 28, wherein said first substantially U-shaped slide member is disposed in a third plane and said second substantially U-shaped slide member is disposed in a fourth plane, said third plane and said fourth plane intersecting at an angle of substantially forty-five (45) degrees.

30. A trombone slide in accordance with claim 29, wherein said mouth piece includes a venturi tube of conventional taper.

31. A trombone slide in accordance with claim 30, wherein the length of said venturi tube is in excess of seven inches and does not exceed nine inches in length.

32. A trombone slide in accordance with claim 27, wherein said mouth piece includes a venturi tube of conventional taper.

33. A trombone slide in accordance with claim 32, wherein the length of said venturi tube is in excess of seven inches and does not exceed nine inches in length.

34. A trombone slide in accordance with claim 27, wherein said coupling means comprises a connecting crook of tubing.

35. A trombone slide in accordance with claim 27, wherein said bell is of conventional length.

36. A trombone slide in accordance with claim 35, wherein said slide assembly can be slidably positioned along said first and second pairs of stationary tubes in any of at least seven positions corresponding to seven half-tone pitch positions.

37. A trombone slide in accordance with claim 36, wherein the instrument tube length in said first or shorter of said positions is substantially one hundred and ten inches and the instrument tube length in the seventh or longest of said positions is substantially one hundred and seventy-three inches.

38. A trombone slide in accordance with claim 27, wherein one of each of said adjacent legs of each of said substantially U-shaped slide tube members comprises a receiver tube, corresponding said stationary tubes being dimensioned to slidably engage over said substantially U-shaped slide tube members, the other of each of said adjacent legs of each of said substantially U-shaped slide tube members being dimensioned to slidably engage over corresponding said stationary tubes which each comprise a receiver tube.

39. A trombone slide in accordance with claim 38, wherein said first plane and said second plane are substantially parallel.

40. A trombone slide in accordance with claim 39, wherein said first substantially U-shaped slide member is disposed in a third plane and said second substantially U-shaped slide member is disposed in a fourth plane, said third plane and said fourth plane intersecting at an angle of substantially forty-five (45) degrees.

41. A trombone slide in accordance with claim 40, wherein said first pair of stationary tubes each comprise said receiver tubes of said first and second pairs of stationary tubes, said second pair of stationary tubes each being dimensioned to slidably engage over corresponding said substantially U-shaped slide tube members, such said substantially U-shaped slide tube members each comprising said receiver tube of said substantially U-shaped slide tube members.

42. A trombone slide in accordance with claim 41, wherein said mouth piece includes a venturi tube of conventional taper.

43. A trombone slide in accordance with claim 42, wherein the length of said venturi tube is in excess of seven inches and does not exceed nine inches in length.

44. A trombone slide in accordance with claim 27, further comprising means for precluding said slide assembly from separating from said first and said second pairs of stationary tubes when slidably engaged therewith.

45. A trombone slide in accordance with claim 44, when said precluding means comprises a stop disposed on said slide assembly and a member disposed on one of said pairs of stationary tubes for engaging said stop.

46. A trombone slide in accordance with claim 45, when said member is adjustable in length.

47. A trombone slide in accordance with claim 46, when said member is removable.

48. A trombone slide in accordance with claim 45, when said member is removable.

49. A trombone slide in accordance with claim 45, when said member can be engaged or disengaged by the user of said brass wind instrument.

50. A trombone slide in accordance with claim 27, wherein each of said crooks of said first and said second substantially U-shaped slide tube members have disposed therein an aperture, said first and said second substantially U-shaped slide tube members each further comprising a water key, each of said water keys for selectively covering a corresponding said aperture.

51. A trombone slide in accordance with claim 27, wherein said slide tube assembly further comprises at least one brace for fixedly positioning said first and said second substantially U-shaped slide tube member relative to each other.

52. A trombone slide in accordance with claim 27, further comprising at least one brace for fixedly positioning said first and said second pairs of stationary tubes relative to each other.

53. A brass wind instrument which changes pitch by varying the tube length thereof comprising:

a first pair of stationary tubes disposed spaced apart from each other in a first plane, said first plane and said second plane being substantially parallel, each of said tubes of said first pair having a first end and a second end;

a second pair of stationary tubes disposed spaced apart from each other in a second plane, said first plane and said second plane being substantially parallel, each of said tubes of said second pair having a first end and a second end, said second plane being spaced apart from said first plane, said second pair of stationary tubes being closer to each other than said first pair of stationary tubes are to each other;

means for coupling said first ends of said second pair of stationary tubes to each other;

a bell for affixment to said first end of one of said first pair of stationary tubes;

a mouth piece for affixment to said first end of the other of said first pair of stationary tubes; and a slide assembly, said slide assembly including a first and a second substantially U-shaped slide tube member, said first and said second slide tube members each having a pair of adjacent legs, each of said adjacent legs each having a first and a second end, each of said pair of adjacent legs being joined on said first ends thereof by a crook, said second ends of each of said pairs of adjacent legs being dimensioned for slidably engaging a corresponding one of said second ends of said first and said second pairs of stationary tubes such that said second ends of said first pair of said adjacent legs slidably engage, respectively, one of said second ends of said first pair of said stationary tubes and one of said second ends of said second pair of stationary tubes, said second ends of said second pair of said adjacent legs slidably engaging, respectively, the other of said second ends of said first pair of said stationary tubes and the other of said second ends of said second pair of said stationary tubes, said first and said second pairs of substantially U-shaped slide tube members being joined together for simultaneous movement, said first substantially U-shaped slide member being disposed in a third plane and said second substantially U-shaped slide member being disposed in a fourth plane, said third plane and said fourth plane intersecting at an angle of substantially forty-five (45) degrees.

54. An instrument in accordance with claim 53, wherein said mouth piece includes a venturi tube of conventional taper.

55. An instrument in accordance with claim 54, wherein the length of said venturi tube is in excess of seven inches and does not exceed nine inches in length.

56. An instrument in accordance with claim 53, wherein said mouth piece includes a venturi tube of conventional taper.

57. An instrument in accordance with claim 56, wherein the length of said venturi tube is in excess of seven inches and does not exceed nine inches in length.

58. An instrument in accordance with claim 53, wherein said coupling means comprises a connecting crook of tubing.

59. An instrument in accordance with claim 53, wherein said bell is of conventional length.

60. An instrument in accordance with claim 59, wherein said slide assembly can be slidably positioned along said first and second pairs of stationary tubes in any of at least seven positions corresponding to seven half-tone pitch positions.

61. An instrument in accordance with claim 60, wherein the instrument tube length in said first or shorter of said positions is substantially one hundred and ten inches and the instrument tube length in the seventh or longest of said positions is substantially one hundred and seventy-three inches.

62. An instrument in accordance with claim 53, wherein one of each of said adjacent legs of each of said substantially U-shaped slide tube members comprises a receiver tube, corresponding said stationary tubes being dimensioned to slidably engage over said substantially U-shaped slide tube members, the other of each of said adjacent legs of each of said substantially U-shaped slide tube members being dimensioned to slidably engage over corresponding said stationary tubes which each comprise a receiver tube.

63. An instrument in accordance with claim 62, wherein said first plane and said second plane are substantially parallel.

64. An instrument in accordance with claim 63, wherein said first substantially U-shaped slide member is disposed in a third plane and said second substantially U-shaped slide member is disposed in a fourth plane, said third plane and said fourth plane intersecting at an angle of substantially forty-five (45) degrees.

65. An instrument in accordance with claim 64, wherein said first pair of stationary tubes each comprise said receiver tubes of said first and said second pairs of stationary tubes, said second pair of stationary tubes each being dimensioned to slidably engage over corresponding said substantially U-shaped slide tube members, such said substantially U-shaped slide tube members each comprising said receiver tubes of said substantially U-shaped slide tube members.

66. An instrument in accordance with claim 65, wherein said mouth piece includes a venturi tube of conventional taper.

67. An instrument in accordance with claim 66, wherein the length of said venturi tube is in excess of seven inches and does not exceed nine inches in length.

68. An instrument in accordance with claim 53, further comprising means for precluding said slide assembly from separating from said first and said second pairs of stationary tubes when extended and slidably engaged therewith.

69. An instrument in accordance with claim 68, when said precluding means comprises a stop disposed on said slide assembly and a member disposed on one of said pairs of stationary tubes for engaging said stop.

70. An instrument in accordance with claim 69, when said member is adjustable in length.

71. An instrument in accordance with claim 70, when said member is removable.

72. An instrument in accordance with claim 69, when said member is removable.

73. An instrument in accordance with claim 69, when said member can be engaged or disengaged by the user of said brass wind instrument.

74. An instrument in accordance with claim 53, wherein each of said crooks of said first and said second substantially U-shaped slide tube members have disposed therein an aperture, said first and said second substantially U-shaped slide tube members each further comprising a water key, each of said water keys for selectively covering a corresponding said aperture.

75. An instrument in accordance with claim 53, wherein said slide tube assembly further comprises at least one brace for fixedly positioning said first and said second substantially U-shaped slide tube member relative to each other.

76. An instrument in accordance with claim 53, further comprising at least one brace for fixedly positioning said first and said second pairs of stationary tubes relative to each other.

77. A trombone slide for use in conjunction with a conventional trombone bell and mouthpiece comprising:

a first pair of stationary tubes disposed spaced apart from each other in a first plane, said first plane and said second plane being substantially parallel, each of said tubes of said first pair having a first end and a second end, said first end of one of said first pair of stationary tubes being adapted to be affixed to said conventional mouthpiece, said first end of the other of said first pair of stationary tubes being adapted to be affixed to said conventional bell;

a second pair of stationary tubes disposed spaced apart from each other in a second plane, each of said tubes of said second pair having a first end and a second end, said second plane being spaced apart from said first plane, said second pair of stationary tubes being closer to each other than said first pair of stationary tubes are to each other;

a slide assembly, said slide assembly including a first and a second substantially U-shaped slide tube member, said first and said second slide tube members each having a pair of adjacent legs, each of said adjacent legs each having a first and a second end, each of said pair of adjacent legs being joined on said first ends thereof by a crook; said second ends of each of said pairs of adjacent legs being dimensioned for slidably engaging a corresponding one of said second ends of said first and said second pairs of stationary tubes such that said second ends of said first pair of said adjacent legs slidably engage, respectively, one of said second end of said first pair of stationary tubes and one of each said second ends of said second pair of said stationary tubes, said second ends of said second pair of said adjacent legs slidably engaging, respectively, the other of said second ends of said first pair of said stationary tubes and the other of said second ends of said second pair of said stationary tubes, said first and second pairs of substantially U-shaped slide tube members being joined together for simultaneous movement, said first substantially U-shaped slide member being disposed in a third plane and said second substantially U-shaped slide member being disposed in a fourth plane, said third plane and said fourth plane intersecting at an angle of substantially forty-five (45) degrees, the spacial relationship between said first and said second pairs of stationary tubes and said first and said second substantially U-shaped slide tube members providing an air passage between said conventional bell and said conventional mouthpiece of a length equal to that of a conventional trombone.

78. A trombone slide in accordance with claim 77, wherein said mouth piece includes a venturi tube of conventional taper.

79. A trombone slide in accordance with claim 78, wherein the length of said venturi tube is in excess of seven inches and does not exceed nine inches in length.

80. A trombone slide in accordance with claim 77, wherein said mouth piece includes a venturi tube of conventional taper.

81. A trombone slide in accordance with claim 80, wherein the length of said venturi tube is in excess of seven inches and does not exceed nine inches in length.

82. A trombone slide in accordance with claim 77, wherein said coupling means comprises a connecting crook of tubing.

83. A trombone slide in accordance with claim 77, wherein said bell is of conventional length.

84. A trombone slide in accordance with claim 83, wherein said slide assembly can be slidably positioned along said first and second pairs of stationary tubes in any of at least seven positions corresponding to seven half-tone pitch positions.

85. A trombone slide in accordance with claim 84, wherein the instrument tube length in said first or shorter of said positions is substantially one hundred and ten inches and the instrument tube length in the seventh or longest of said positions is substantially one hundred and seventy-three inches.

86. A trombone slide in accordance with claim 77, wherein one of each of said adjacent legs of each of said substantially U-shaped slide tube members comprises a receiver tube, corresponding said stationary tubes being dimensioned to slidably engage over said substantially U-shaped slide tube members, the other of each of said adjacent legs of each of said substantially U-shaped slide tube members being dimensioned to slidably engage over corresponding said stationary tubes which each comprise a receiver tube.

87. A trombone slide in accordance with claim 86, wherein said first plane and said second plane are substantially parallel.

88. A trombone slide in accordance with claim 87, wherein said first substantially U-shaped slide member is disposed in a third plane and said second substantially U-shaped slide member is disposed in a fourth plane, said third plane and said fourth plane intersecting at an angle of substantially forty-five (45) degrees.

89. A trombone slide in accordance with claim 88, wherein said first pair of stationary tubes each comprise said receiver tubes of said first and second pairs of stationary tubes, said second pair of stationary tubes each being dimensioned to slidably engage over corresponding said substantially U-shaped slide tube members, such said substantially U-shaped slide tube members each comprising said receiver tube of said substantially U-shaped slide tube members.

90. A trombone slide in accordance with claim 89, wherein said mouth piece includes a venturi tube of conventional taper.

91. A trombone slide in accordance with claim 90, wherein the length of said venturi tube is in excess of seven inches and does not exceed nine inches in length.

92. A trombone slide in accordance with claim 77, further comprising means for precluding said slide assembly from separating from said first and said second pairs of stationary tubes when slidably engaged therewith.

93. A trombone slide in accordance with claim 92, when said precluding means comprises a stop disposed on said slide assembly and a member disposed on one of said pairs of stationary tubes for engaging said stop.

94. A trombone slide in accordance with claim 93, when said member is adjustable in length.

95. A trombone slide in accordance with claim 94, when said member is removable.

96. A trombone slide in accordance with claim 93, when said member is removable.

97. A trombone slide in accordance with claim 93, when said member can be engaged or disengaged by the user of said brass wind instrument.

98. A trombone slide in accordance with claim 77, wherein each of said crooks of said first and said second substantially U-shaped slide tube members have disposed therein an aperture, said first and said second substantially U-shaped slide tube members each further comprising a water key, each of said water keys for selectively covering a corresponding said aperture.

99. A trombone slide in accordance with claim 77, wherein said slide tube assembly further comprises at least one brace for fixedly positioning said first and said second substantially U-shaped slide tube member relative to each other.

100. A trombone slide in accordance with claim 77, further comprising at least one brace for fixedly positioning said first and said second pairs of stationary tubes relative to each other.

* * * * *